US008938336B2

(12) United States Patent
Lee et al.

(10) Patent No.: US 8,938,336 B2
(45) Date of Patent: Jan. 20, 2015

(54) OCCUPANT SAFETY SYSTEM AND METHOD WITH OPTICAL FIBER GRID SHEET

(71) Applicant: Korea Electronics Technology Institute, Seongnam-si, Gyeonggi-do (KR)

(72) Inventors: Sang Yub Lee, Yongin-si (KR); Sang Hyun Park, Seongnam-si (KR); Hyo Sub Choi, Jeollabuk-do (KR); Soo Young Min, Suwon-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/160,820

(22) Filed: Jan. 22, 2014

(65) Prior Publication Data

US 2014/0214282 A1   Jul. 31, 2014

(30) Foreign Application Priority Data

Jan. 30, 2013 (KR) ........................ 10-2013-0010358

(51) Int. Cl.
*B60R 22/00* (2006.01)
*B60R 21/0136* (2006.01)
*G01L 1/24* (2006.01)

(52) U.S. Cl.
CPC .............. *B60R 21/0136* (2013.01); *G01L 1/24* (2013.01)
USPC ......................................................... 701/45

(58) Field of Classification Search
None
See application file for complete search history.

(56) References Cited

U.S. PATENT DOCUMENTS

| 4,936,649 | A  | * | 6/1990 | Lymer et al. ..................... 385/13 |
| 7,189,959 | B1 | * | 3/2007 | Morison et al. ........... 250/227.14 |
| 2009/0196026 | A1 | * | 8/2009 | Finke et al. .................... 362/156 |
| 2010/0033988 | A1 | * | 2/2010 | Chiu et al. ..................... 362/619 |
| 2010/0225460 | A1 | * | 9/2010 | Watanabe et al. ............. 340/436 |
| 2012/0065843 | A1 | * | 3/2012 | Thomas et al. ................. 701/45 |

FOREIGN PATENT DOCUMENTS

| JP | 2007040737 A | 2/2007 |
| KR | 1020100060670 A | 6/2010 |

OTHER PUBLICATIONS

Korean Office Action for application No. 10-2013-0010358 dated Feb. 14, 2014.

* cited by examiner

*Primary Examiner* — Thomas Tarcza
*Assistant Examiner* — Adam Alharbi
(74) *Attorney, Agent, or Firm* — Lowe Hauptman & Ham, LLP

(57) ABSTRACT

An occupant safety system using an optical fiber grid sheet and a method thereof are provided. The occupant safety system applies light to optical fibers constituting an optical fiber grid which is attached to a moving body and in which the optical fibers are arranged in a grid pattern; receives the applied light through the optical fibers; grasps a location of impact on the moving body based on the received light receiving signals; and controls operations of safety devices provided in the moving body based on the grasped location of the impact. Accordingly, the occupant safety system can sense impacts on the moving body everywhere through the optical fiber grid, and can exactly grasp the location of the impact and can drive an appropriate safety device timely. Therefore, the occupant can be protected safely.

13 Claims, 6 Drawing Sheets 1  2  3  4

110

COLLECT IMPACT SENSING

OCCUPANT SAFETY SYSTEM AND METHOD WITH OPTICAL FIBER GRID SHEET

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Jan. 30, 2013, and assigned Serial No. 10-2013-0010358, the entire disclosure of which is hereby incorporated by reference.

TECHNICAL FIELD OF THE INVENTION

Methods and apparatuses consistent with exemplary embodiments relate to an occupant safety system and a method thereof, and more particularly, to an occupant safety system, which can ensure occupant's safety by grasping an accident situation and appropriately driving an occupant safety device, and a method thereof.

BACKGROUND OF THE INVENTION

Occupant safety devices such as seatbelts, air bags and air belts are driven according to an accident situation grasped based on a combination of a moving speed and acceleration, a geomagnetic sensor, a direction sensor, and a brake pressure sensor of a moving body (a car, a motorcycle, etc.).

The most important factor that should be considered when such a safety device is driven is an impact caused by a collision of the moving body. However, since the impact sensor is not installed in all areas of the moving body, it is impossible to sense impacts on the moving body everywhere.

Such incomplete impact sensing may incur malfunction of the safety devices, which in turn threatens the occupant's life and safety.

Algorithms to prevent such malfunction have been developed. However, since such algorithms are complex, they may make it difficult to develop and implement the occupant safety devices, and also, have the possibility of causing another error.

SUMMARY OF THE INVENTION

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an occupant safety system, which can take safety measures exactly by grasping a location and a degree of impact exerted to a moving body using an optical fiber grid sheet, and a method thereof.

According to an aspect of an exemplary embodiment, there is provided an occupant safety system including: an optical fiber grid configured to be attached to a moving body and in which optical fibers are arranged in a grid pattern; a light emitter configured to apply light to the optical fibers of the optical fiber grid; a light receiver configured to receive light applied by the light emitter through the optical fibers; an impact grasper configured to grasp a location of impact on the moving body based on light receiving signals transmitted from the light receiver; and a controller configured to control operations of safety devices provided in the moving body based on the location of the impact grasped by the impact grasper.

The optical fiber grid may be of a sheet type such that the optical fiber grid is attachable to each area of the moving body.

The optical fibers constituting the optical fiber grid may be optical fibers consisting of only cores.

The optical fibers may be arranged in a transparent sheet.

The optical fiber grid may be attached to at least one of a body, a glass, a headlight, and a taillight of the moving body.

The impact grasper may further grasp a degree of impact occurring on the moving body based on a degree of attenuation of the light receiving signals, and the controller may control the operations of the safety devices further considering the degree of the impact in addition to the location of the impact.

The controller may calculate a direction of propagation of the impact from the location of the impact and may further control the operations of the safety devices according to the calculated direction of propagation of the impact.

According to an aspect of another exemplary embodiment, there is provided a control method of an occupant safety device, the control method including: applying light to optical fibers constituting an optical fiber grid which is attached to a moving body and in which the optical fibers are arranged in a grid pattern; receiving the applied light through the optical fibers; grasping a location of impact on the moving body based on the received light receiving signals; and controlling operations of safety devices provided in the moving body based on the grasped location of the impact.

According to the exemplary embodiments described above, the occupant safety system can sense impacts on the moving body everywhere through the optical fiber grid sheet, and can exactly grasp the location of the impact and can drive an appropriate safety device timely. Therefore, the occupant can be protected safely.

In particular, it is possible to exactly grasp the impact on the glass, headlight, and taillight of the car as well as impact on the car, and also, it is possible to exactly sense minimal impact. Therefore, the occupant's safety can be ensured.

Also, the occupant safety system can 3-dimensionally collect impact location information through the optical fiber grid sheet, and thus a related-art complex algorithm to calculate a location of impact is not required. Also, it is easy to develop and commercialize the occupant safety system, and an error caused by the algorithm can be prevented, and functional reliability can be improved.

Also, by grasping a direction of propagation of the impact on a real time basis and utilizing the direction of propagation of the impact in the control of the safety device, the occupant can be protected from a secondary accident.

BRIEF DESCRIPTION OF THE DRAWINGS

The above and/or other aspects will be more apparent by describing in detail exemplary embodiments, with reference to the accompanying drawings, in which.

DETAILED DESCRIPTION OF THE INVENTION

Figure 1:
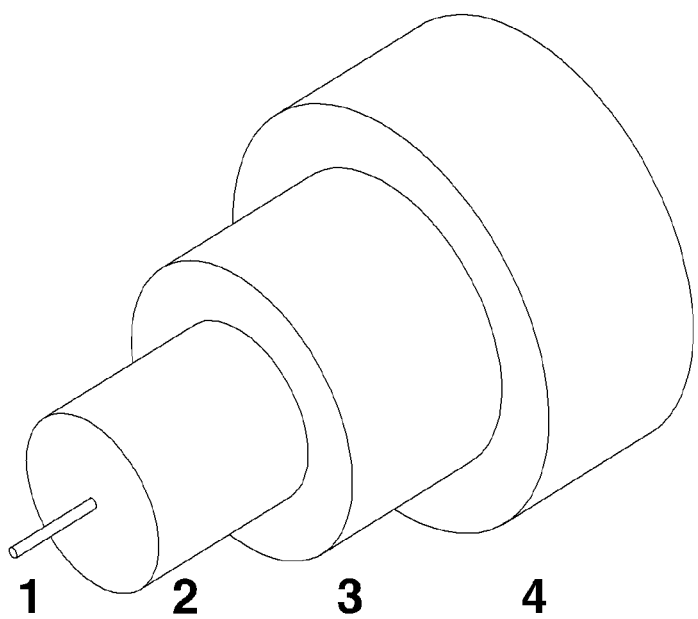
FIG. 1 is a view illustrating a configuration of a related-art optical fiber.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 2:
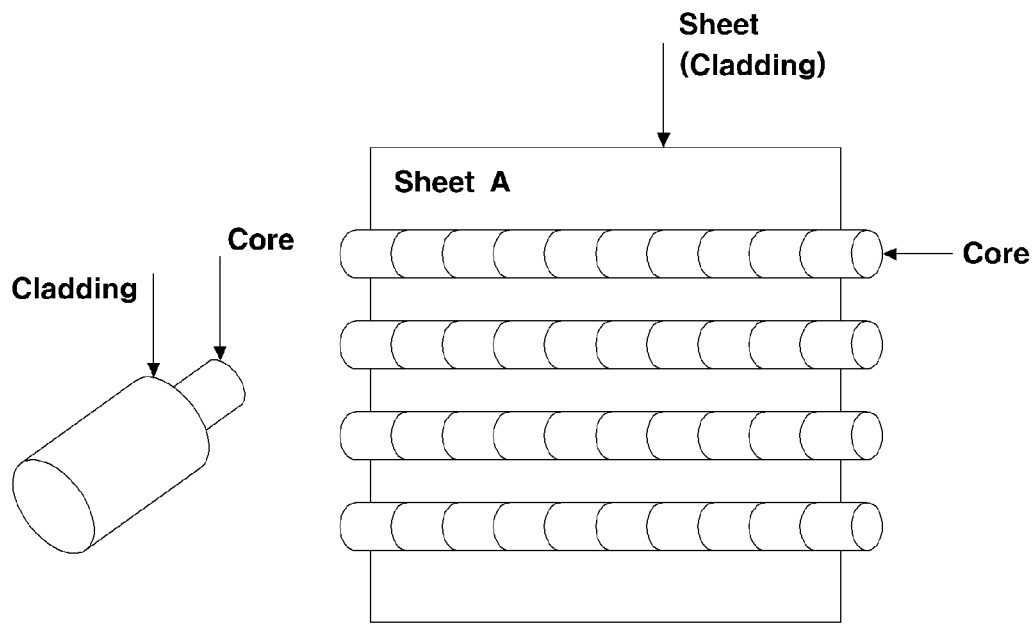
FIG. 2 is a view illustrating an optical fiber grid sheet which is used in an occupant safety system according to an exemplary embodiment.
Figure 2:
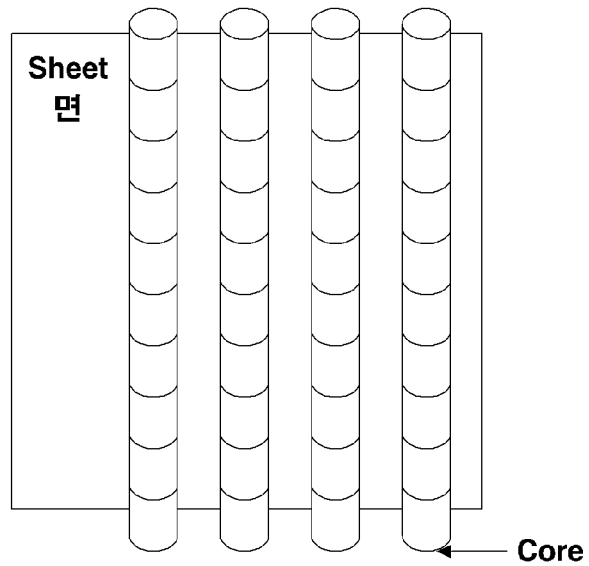

FIG. 2 is a view to illustrate an optical fiber grid sheet which is used in an occupant safety system according to an exemplary embodiment.

As shown in FIG. 2, the optical fiber grid sheet (or film) has a plurality of optical fibers arranged on one surface of the sheet in a horizontal direction, and a plurality of optical fibers arranged on the other surface of the sheet in a vertical direction.

Figure 3:
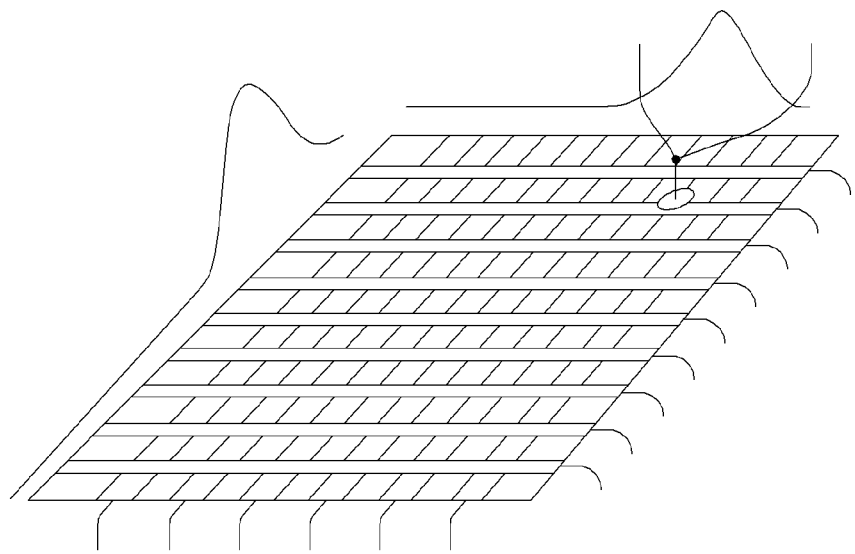
FIG. 3 is a view illustrating an optical fiber grid sheet in which optical fibers are arranged in a grid pattern.

As a result, the optical fiber grid sheet 110 in which the optical fibers are arranged in a grid pattern is implemented as shown in FIG. 3. When light is applied to light emitting elements of one ends of the optical fibers and light is sensed by light receiving elements of the other ends of the optical fibers, the occupant safety system can identify where impact occurs.

The optical fibers subject to the impact do not transmit the light applied to the one ends to the other ends or sense attenuated light. Therefore, it is possible to grasp a location of the impact and a degree of the impact by grasping which optical fiber(s) do not sense the light or which optical fiber(s) sense attenuated light from among the horizontal optical fibers and the vertical optical fibers.

The optical fibers constituting the optical fiber grid sheet 110 may be implemented by using only cores as shown in FIG. 2. Therefore, the optical fiber of the present disclosure is different from a related-art optical fiber, which includes a cladding 2 and protection sheath materials 3 and 5 in addition to a core 1, as shown in FIG. 1.

On the other hand, a plurality of sheets for protecting and cladding the optical fiber cores may be layered one on another such that the horizontal optical fibers and the vertical optical fibers can be located between the sheets. Also, the sheet may be implemented by using transparent material so that it can be checked up or repaired easily.

Figure 4:
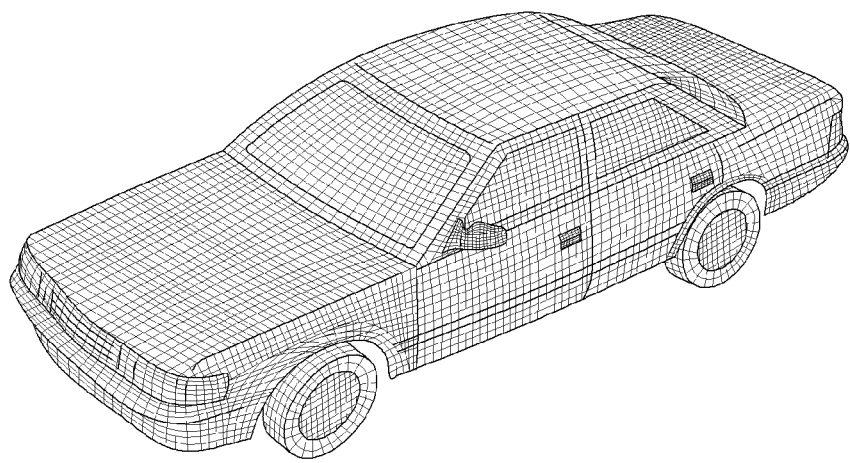
FIG. 4 is a view illustrating an optical fiber grid sheet which is applied to all interior areas of a car.

Since the optical fiber grid sheet 110 is thin and flexible, it can be attached to any shape. Accordingly, the optical fiber grid sheet 100 may be attached to all areas of a car. FIG. 4 schematically illustrates the optical fiber grid sheet 110 which can be applied to all interior areas of a car. Since the optical fiber grid sheet 110 is thin and has high transmittance, the optical fiber grid sheet 110 can be attached to glass windows, headlights, and taillights of the car as well as a car body.

In addition, since the optical fiber grid sheet 110 is light, it hardly affects the weight of the car and can sense minimal impact exerted to the car.

Also, since the optical fiber grid sheet 110 can be applied to all of the areas of the car, it is possible to exactly grasp locations of the impacts occurring on the car everywhere. In particular, the occupant safety system 100 can 3-dimensionally grasp locations of impacts exerted to side surfaces of the car as well as impacts exerted to the front and rear of the car, exactly and swiftly, and also can grasp locations of impacts exerted to the glass windows, the headlights, and the taillights of the car.

Figure 5:
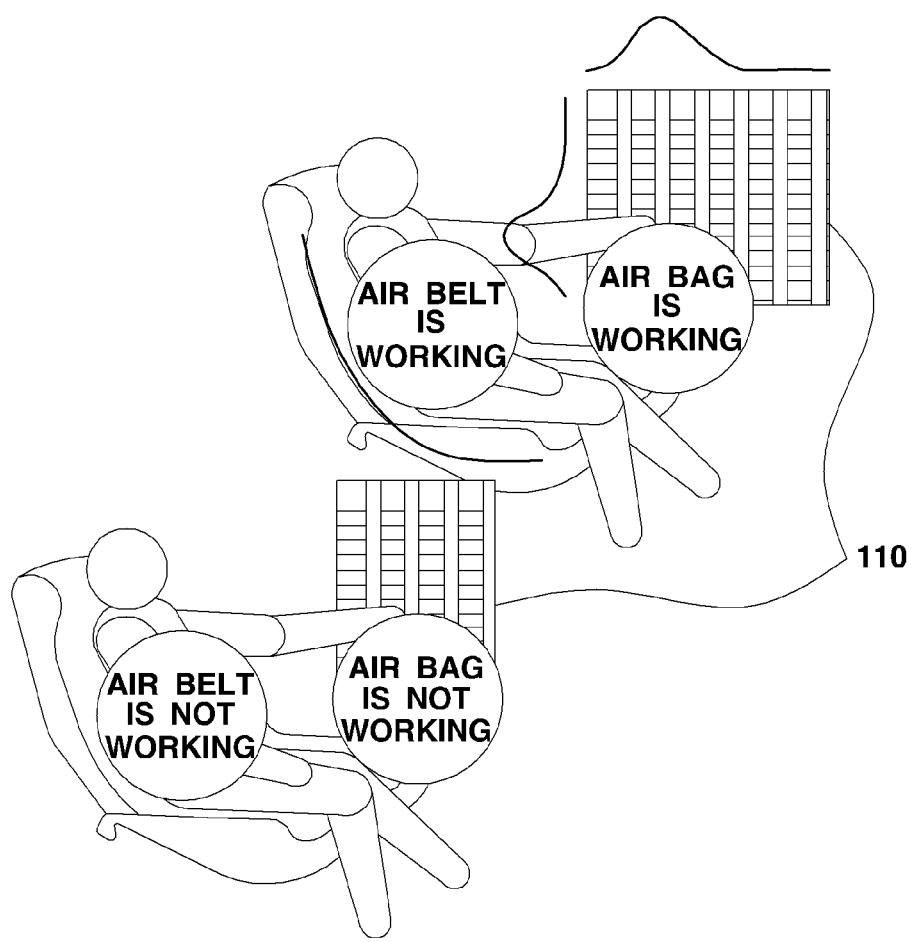
FIG. 5 is a view illustrating a concept of independent control of a safety device according to a location of impact.

Accordingly, when the impact occurs ahead of a driver's seat as shown in FIG. 5, it is possible to control safety devices separately by working an air bag and an air belt of the driver's seat without working an air bag and an air belt of a passenger's seat.

For another example, when a relatively minimal impact is exerted to the windshield, it is possible to control only the air belt to work without working the air bag, which may disturb the driver.

Since the occupant safety system 100 directly senses the impacts from the car everywhere through the optical fiber grid sheet 110, a complex algorithm for calculating the location of the impact is not required, the occupant safety system 100 is easy to implement, develop, and commercialize, errors caused by the complex algorithm can be prevented, and reliability can be guaranteed.

Figure 6:
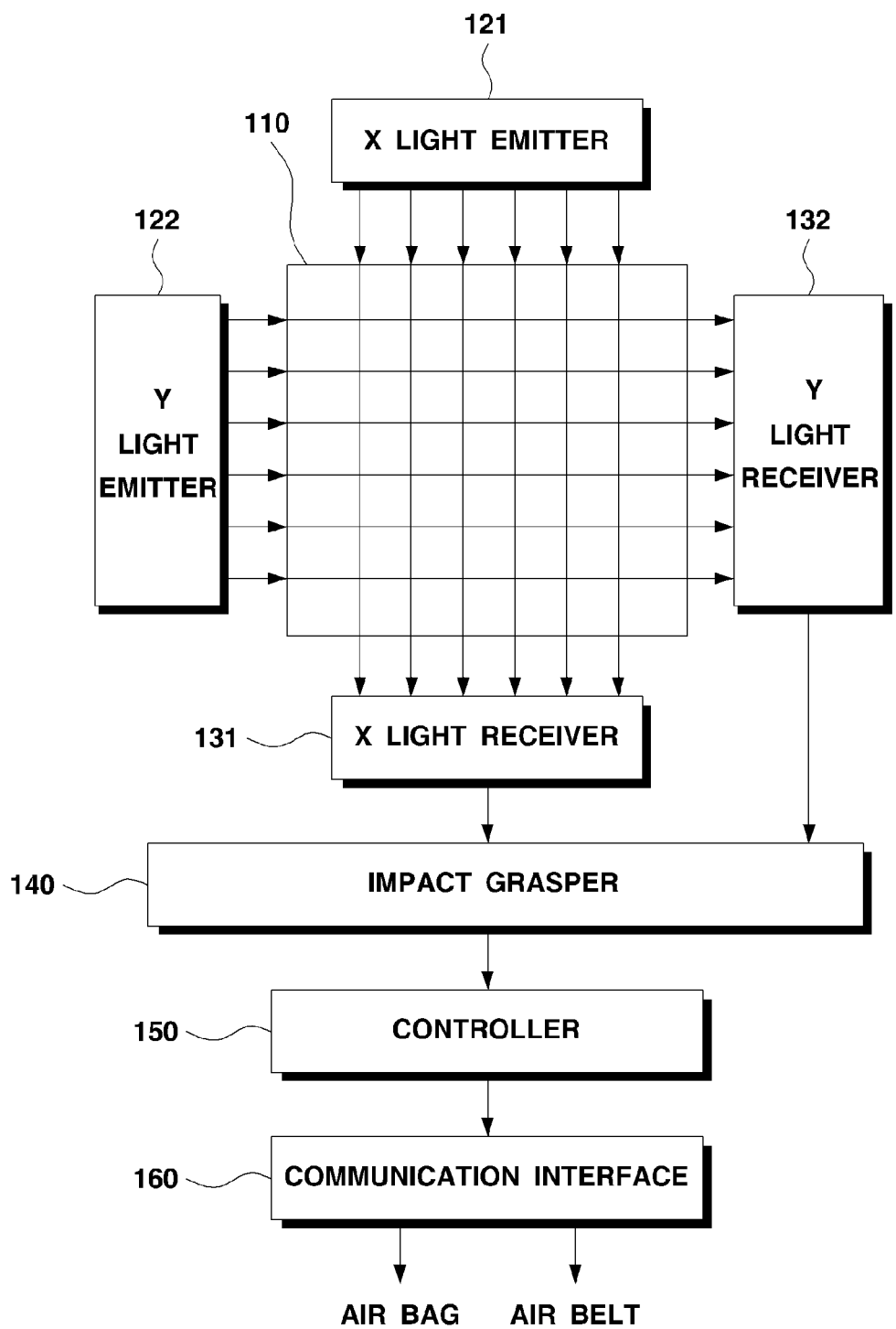
FIG. 6 is a block diagram illustrating an occupant safety system which uses an optical fiber grid sheet.

FIG. 6 is a block diagram of an occupant safety system which uses an optical fiber grid sheet. As shown in FIG. 6, the occupant safety system 100 includes an optical fiber grid sheet 110, light emitters 121 and 122, light receivers 131 and 132, an impact grasper 140, a controller 150, and a communication interface 160.

The X light emitter 121 applies light to optical fibers of the optical fiber grid sheet 110 that are arranged perpendicular to the X-axis, and the Y light emitter 122 applies light to optical fibers of the optical fiber grid sheet 110 that are arranged perpendicular to the Y-axis.

The X light receiver 131 receives the light applied by the X light emitter 121 through the optical fibers of the optical fiber grid sheet 110 that are arranged perpendicular to the X-axis, and the Y light receiver 132 receives the light applied by the Y light emitter 122 through the optical fibers of the optical fiber grid sheet 110 that are arranged perpendicular to the Y-axis.

The impact grasper 140 grasps a location and an degree of impact based on light receiving signals received through the X light receiver 131 and the Y light receiver 132. Specifically, the impact grasper 140 may grasp the location of the impact based on a combination of X, Y coordinates where there is no light receiving signal or the light receiving signal attenuates, and may grasp the degree of the impact based on a degree of attenuation of the light receiving signal. As the degree of attenuation of the light receiving signal increases, the degree of the impact increases, and, as the degree of attenuation decreases, the magnitude of the impact decreases.

The controller 150 determine a safety device (an air bag, an air belt, etc.) to work based on the location and the degree of the impact grasped by the impact grasper 140, and controls the determined safety device to work through the communication interface 160.

Figure 7:
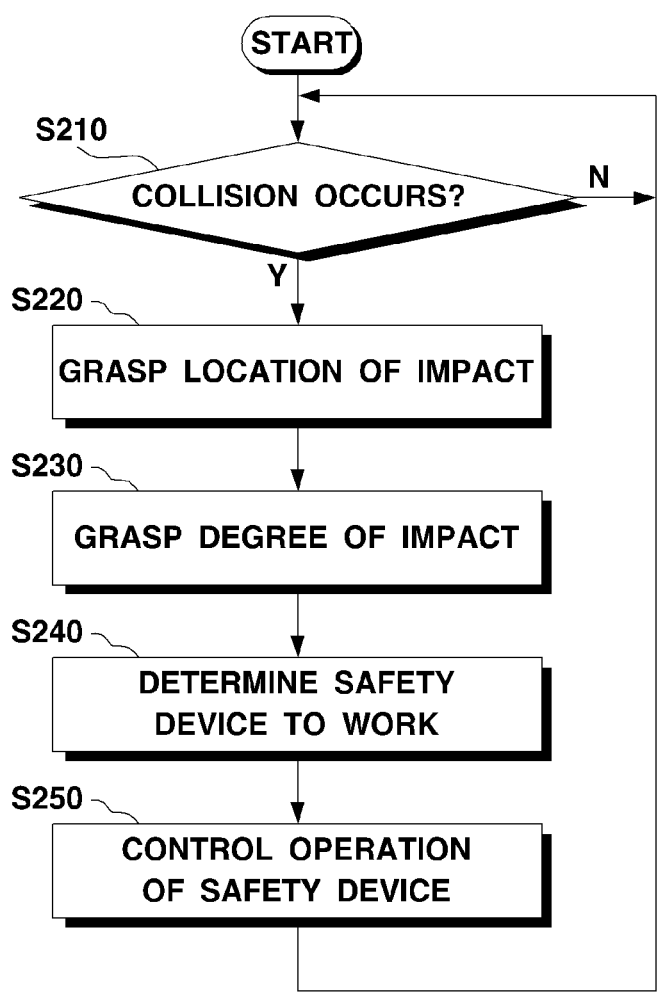
FIG. 7 is a flowchart illustrating a method for controlling a safety device using the occupant safety system of FIG. 6.

FIG. 7 is a flowchart to illustrate a method for controlling a safety device of the occupant safety system of FIG. 6.

As shown in FIG. 7, when a collision occurs on a car (S210—Y), the impact grasper 140 grasps a location and a degree of impact based on light receiving signals received by the X light receiver 131 and the Y light receiver 132 (S220 and S230).

After that, the controller 150 determines safety devices to work based on the location and the degree of the impact grasped in operations S220 and S230 (S240). For example, 1) the controller 150 determines air bags and air belts of a driver's seat and a passenger's seat to work against great impacts on the front/rear of the car, 2) the controller 150 determines only the air belts of the driver's seat and the passenger's seat to work against minimal impacts on the front/rear of the car, 3) the controller 150 determines the air bag and the air belt of the driver's seat to work against great impact on the driver's seat, 4) the controller 150 determines only the air belt of the driver's seat to work against minimal impact on the driver's seat, 5) the controller 150 determines the air bag and the air belt of the passenger's seat to work against great impact on the passenger's seat, and 6) the controller 150 determines only the air belt of the passenger's seat to work against minimal impact on the passenger's seat.

After that, the controller 150 controls the safety devices determined in operation S240 to work (S250).

The procedures illustrated in FIG. 7 are performed repeatedly and on a real time basis. Accordingly, the controller 150 may grasp a direction of propagation of the impact caused by the collision based on the location and the degree of the impact collected on a real time basis, and may grasp a type of accident based on the direction of propagation of the impact and may further work additional safety devices, so that the occupants' safety can be ensured. Furthermore, it is possible to control the operations of the air bag and the air belt in phases based on the direction of propagation of the impact.

Preferred exemplary embodiments of the occupant safety system using the optical fiber grid sheet have been described detail up to now.

The air bag and the air belt mentioned in the above-described exemplary embodiments are a kind of safety device and may be replaced with different kinds of safety devices. When different kinds of safety devices are added, the technical idea of the present disclosure can be applied.

Also, it will be appreciated that the present disclosure can be applied to different kinds of moving bodies other than the car (for example, a vehicle, a ship, a motor cycle, etc.).

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An occupant safety system comprising:
    an optical fiber grid configured to be attached to a moving body and comprising optical fibers arranged in a grid pattern;
    a light emitter configured to apply light to the optical fibers of the optical fiber grid;
    a light receiver configured to receive light applied by the light emitter through the optical fibers;
    an impact obtainer configured to obtain a location of impact on the moving body based on light receiving signals transmitted from the light receiver; and
    a controller configured to control operations of safety devices provided in the moving body based on the location of the impact obtained by the impact obtainer,
    wherein the optical fiber grid comprises a transparent sheet attached to a body, a glass, a headlight, and a taillight of the moving body, and the optical fibers are arranged in the transparent sheet.

2. The occupant safety system as claimed in claim 1, wherein the optical fibers constituting the optical fiber grid are optical fibers consisting of only cores.

3. The occupant safety system as claimed in claim 1, wherein the impact obtainer further obtains a degree of impact occurring on the moving body based on a degree of attenuation of the light receiving signals,
    wherein the controller is configured to control the operations of the safety devices further based on the degree of the impact in addition to the location of the impact.

4. The occupant safety device as claimed in claim 1, wherein the controller is configured to calculate a direction of propagation of the impact from the location of the impact and further control the operations of the safety devices according to the calculated direction of propagation of the impact.

5. A control method of an occupant safety device, the control method comprising:
    applying light to optical fibers constituting an optical fiber grid which is attached to a moving body and in which the optical fibers are arranged in a grid pattern;
    receiving the applied light through the optical fibers;
    obtaining a location of impact on the moving body based on the received light; and
    controlling operation of at least one safety device provided in the moving body based on the obtained location of the impact,
    wherein the optical fiber grid comprises a transparent sheet attached to a body, a glass, a headlight, and a taillight of the moving body, and the optical fibers are arranged in the transparent sheet.

6. The occupant safety system as claimed in claim 1, wherein the safety devices comprise an air bag and an air belt.

7. The occupant safety system as claimed in claim 6, wherein the controller is configured to control the air bag and the air belt to operate separately.

8. The occupant safety system as claimed in claim 3, wherein the safety devices comprise an air bag and an air belt, and the controller is configured to
    in response to the degree of the impact being a first degree, control the air belt to operate without operating the air bag, and
    in response to the degree of the impact being a second degree greater than the first degree, control both the air belt and the air bag to operate.

9. The control method as claimed in claim 5, wherein the at least one safety device comprises an air bag or an air belt.

10. The control method as claimed in claim 9, wherein the controlling comprises operating the air bag and the air belt separately.

11. The control method as claimed in claim 5, further comprising:
    obtaining a degree of impact occurring on the moving body based on a degree of attenuation of the received light; and
    controlling the operations of the at least one safety device further based on the degree of the impact in addition to the location of the impact,
    wherein
    the at least one safety device comprises an air bag and an air belt,
    in response to the degree of the impact being a first degree, the controlling comprises operating the air belt without operating the air bag, and
    in response to the degree of the impact being a second degree greater than the first degree, the controlling comprises operating both the air belt and the air bag.

12. The occupant safety system as claimed in claim 2, wherein the optical fiber grid comprises:
- first optical fibers extending in a first direction,
- second optical fibers extending in a second direction transverse to the first direction, and
- a plurality of sheets for protecting and cladding the cores of the first and second optical fibers, wherein the sheets are layered one on another, the first optical fibers and the second optical fibers are located between the sheets, and one of the sheets is located between the first optical fibers and the second optical fibers.

13. The occupant safety system as claimed in claim 12, wherein the sheets are in direct contact with the cores of the first and second optical fibers and define cladding for the cores of the first and second optical fibers.

\* \* \* \* \*